US008063577B2

(12) United States Patent
Sauerlaender et al.

(10) Patent No.: US 8,063,577 B2
(45) Date of Patent: Nov. 22, 2011

(54) METHOD AND A DRIVER CIRCUIT FOR LED OPERATION

(75) Inventors: Georg Sauerlaender, Aachen (DE); Reinhold Elferich, Aachen (DE); Bernd Ackermann, Aachen (DE); Dirk Hente, Wuerselen (DE); Christoph Martiny, Aachen (DE); Matthias Wendt, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 784 days.

(21) Appl. No.: 11/719,888

(22) PCT Filed: Nov. 25, 2005

(86) PCT No.: PCT/IB2005/053906
§ 371 (c)(1),
(2), (4) Date: May 22, 2007

(87) PCT Pub. No.: WO2006/056960
PCT Pub. Date: Jun. 1, 2006

(65) Prior Publication Data
US 2009/0230875 A1 Sep. 17, 2009

(30) Foreign Application Priority Data

Nov. 29, 2004 (EP) .................................... 04106148
Jul. 4, 2005 (EP) .................................... 05106054

(51) Int. Cl.
H05B 37/02 (2006.01)
(52) U.S. Cl. ......... 315/291; 315/224; 315/276; 315/307

(58) Field of Classification Search .................. 315/105, 315/159, 169.2, 169.3, 169.4, 194, 200 R, 315/219, 224, 225, 244, 246, 247, 276, 291, 315/294, 307, 360, 51, DIG. 4, DIG. 5, DIG. 7; 345/100, 102, 204, 208, 209, 210, 211, 212, 345/63, 70, 76, 77, 78, 79, 87, 90, 92, 94, 345/96, 98; 363/132, 147, 17, 21.01, 21.09, 363/37, 57, 65, 97, 98
See application file for complete search history.

(56) References Cited

U.S. PATENT DOCUMENTS

| 6,040,663 | A  | * | 3/2000  | Bucks et al. ................... 315/291 |
| 6,411,045 | B1 |   | 6/2002  | Nerone |
| 6,577,512 | B2 |   | 6/2003  | Tripathi et al. |
| 6,847,169 | B2 |   | 1/2005  | Ito et al. |
| 6,858,994 | B2 |   | 2/2005  | Vollrath |
| 7,178,971 | B2 | * | 2/2007  | Pong et al. ..................... 315/291 |
| 7,298,634 | B2 | * | 11/2007 | Yasumura ........................ 363/24 |
| 2002/0186026 | A1 | * | 12/2002 | Elferich ......................... 324/652 |
| 2004/0184289 | A1 | * | 9/2004  | Vinciarelli ...................... 363/15 |
| 2005/0029966 | A1 | * | 2/2005  | Buonocunto .................. 315/291 |

FOREIGN PATENT DOCUMENTS

WO    WO2005048658 A1    5/2005
* cited by examiner

*Primary Examiner* — David Hung Vu

(57) ABSTRACT

A driver circuit for operating one or more light emitting diodes(LEDs) is disclosed. An alternating supply current is generated and transformed to an alternating secondary winding voltage. Using rectifier means, such as diodes or synchronous switches, the alternating secondary winding voltage is converted to a substantially constant load current by using a buffer element. The buffer element comprises an output choke, such as an inductor. The power transferred from the power source to the LEDs may be controlled by frequency control of the alternating supply current.

7 Claims, 2 Drawing Sheets

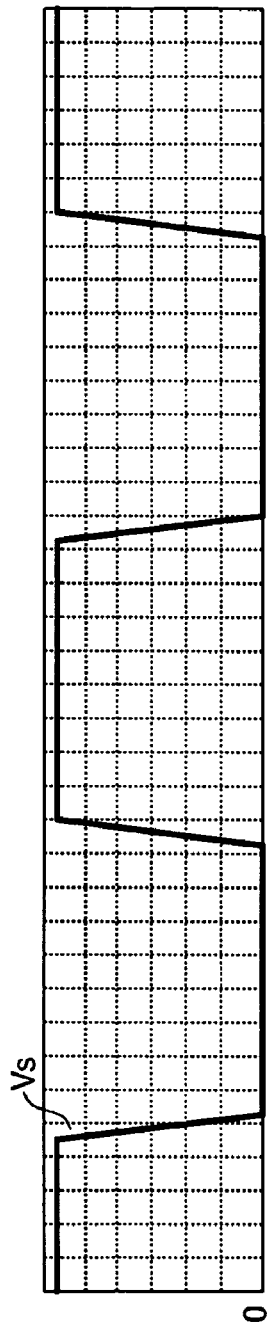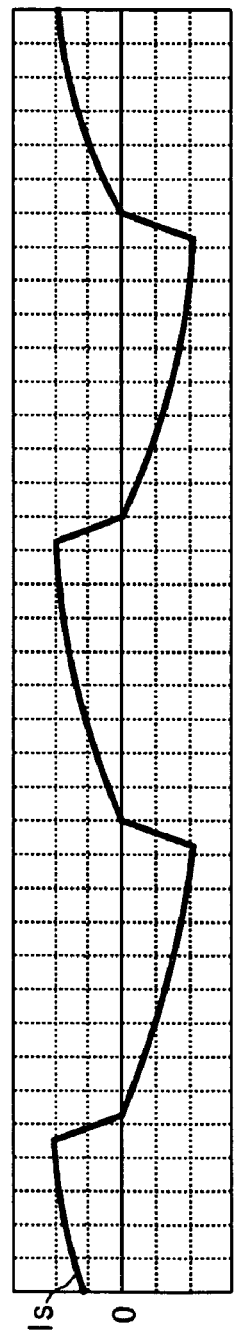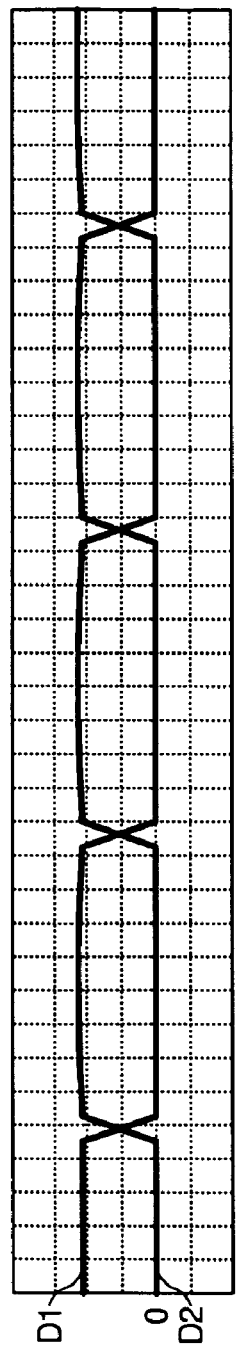

METHOD AND A DRIVER CIRCUIT FOR LED OPERATION

The present invention relates to a driver circuit for operating a number of light emitting diodes (LEDs).

Use of light emitting diodes, LEDs, and in particular high-brightness LEDs, is well established for signaling applications, for example. LEDs are replacing conventional lamps in automotive applications and in some general illumination applications.

LEDs require voltage or preferably current control, since the LEDs exhibit large current variation in response to small voltage variation. It is known to use electronic current sources to control the current through the LED. However, known electronic current sources and/or current control circuitry is not optimized with respect to functionality, efficiency, costs, size and/or reliability.

A known current control system is a switched mode power supply in current control mode. For example, a buck converter may be employed. In an improved buck converter, based on a forward-derived topology, a voltage source and a switch control the current flowing in the primary winding of a transformer. The current generated in the secondary winding of the transformer flows through a LED or a series of LEDs connected in series with an inductor, for example. The LED is shunted by a diode enabling a LED current to flow, if the switch has interrupted the current from flowing through the primary winding of the transformer, thereby interrupting the LED current from flowing through the secondary winding. The transformer performs a voltage adjustment between the primary side and the secondary side of the transformer. Further, due to the galvanical isolation provided by the transformer the LEDs are separated from the input voltage source enabling low-voltage-side switching and low-voltage-side current sensing, for example.

In the above-mentioned converter, the switch is hard-switched resulting in a low efficiency of the converter, and a relatively large EMI filter is required. Further, due to the duty cycle control of the voltage supplied to the primary winding of the transformer a relatively large inductor is needed at the secondary side of the transformer.

It is desirable to have a method and a driver circuit for operating a LED with high efficiency.

In a method according to the present invention an alternating supply current is generated and transformed to an alternating secondary winding voltage. The alternating secondary winding voltage is rectified and buffered for generating a substantially constant load current. The substantially constant load current is supplied to the LED. The transformation of the alternating supply current has the same advantages as mentioned above in relation to the improved buck converter: a load voltage may easily be adapted to a desired load voltage by selecting the turns ratio of the transformer accordingly; the galvanical isolation enables low-voltage-side switching and low-voltage-side current sensing; and the leakage inductance of the transformer may be selected such that the alternating supply current may be generated with zero voltage switching of devices used to generate the alternating supply current, resulting in a high efficiency.

The LED may be one LED or may be a number of LEDs. The number of LEDs may be connected in series, connected in parallel or may be arranged in sets of LEDs connected in series, which sets are connected in parallel.

In an embodiment the method comprises providing a DC voltage and converting the DC voltage to the alternating supply current. From the DC voltage the alternating supply current may easily be generated using a varying DC voltage and a resonant circuit comprising a resonant capacitor and the inductance of the primary winding of the transformer.

Further, in an embodiment, generating the alternating supply current may comprise controlling at least one of a duty cycle and a frequency of the alternating supply current. The control of the frequency and/or duty cycle may be used to control a power transfer to the LED or number of LEDs.

In an embodiment, the duty cycle is controlled to be 50% and the frequency is controlled depending on the required power, requiring only a relatively small buffer element compared to an embodiment, wherein the duty cycle may be controlled to differ from 50%.

A driver circuit according to the present invention comprises a set of input terminals for receiving a supply voltage; a resonant capacitor; a transformer, a primary winding of the transformer and the resonant capacitor being coupled in series to the set of input terminals; a rectifier means coupled to the secondary winding of the transformer for rectifying an alternating secondary winding voltage on the secondary winding of the transformer, and an output circuit coupled to the rectifier means for receiving a rectified voltage, the output circuit comprising a buffer circuitry and a set of output terminals for coupling the LED to the driver circuit. Thus, the driver circuit is configured to perform the method according to the present invention.

In an embodiment of the present invention, the secondary winding of the transformer comprises a first and a second coil. For example, the transformer has a split secondary winding. Thus, in operation, an alternating voltage is generated over each coil of the secondary winding. The rectifier means may alternate to block one of said voltages and couple the other voltage to the output circuitry depending on a phase of the alternating secondary winding voltage in order to supply a DC voltage to the output circuitry.

In an embodiment, the rectifier means comprises a first diode and a second diode, each diode being coupled to a respective coil of the secondary winding. Each diode only couples the voltage over the respective coil to the output circuitry if the respective voltage has a positive value (or a negative value, depending on the forward direction of the diode). Thus, a rectified secondary winding voltage and current are supplied to the output circuitry.

In a further embodiment, the rectifier means comprises a first and a second switch, each being coupled to a respective coil of the secondary winding and the first and the second switch are configured to rectify the alternating secondary winding voltage.

In an embodiment, the driver circuit comprises a bridge circuit coupled to the set of input terminals, the bridge circuit comprising bridge input terminals for receiving a DC voltage. The bridge circuit is configured to generate a suitable supply voltage. The supply voltage may be an alternating voltage or may be a DC voltage having a suitably varying voltage level. The bridge circuit, e.g. a half bridge circuit, comprising a number of switching elements, is a well-known circuit for converting a DC voltage to a block-shaped voltage. Depending on the switching moments of the switching elements, the frequency and the duty cycle of the block-shaped voltage may be controlled. As mentioned above, preferably, the duty cycle is controlled to be 50% and the frequency is controlled in order to control a power transfer to the LED or number of LEDs.

In a further embodiment, the driver circuit comprises a control circuit having a control input terminal for receiving a LED control signal and for controlling the bridge circuit, in particular the switching elements thereof, in response to the LED control signal. The LED control signal may be a LED current and/or a LED voltage, for example. Thus, the control circuit may control the duty cycle and frequency of the supply voltage, and thereby the frequency and duty cycle of the alternating supply current.

Hereinafter, the invention is elucidated with reference to the appended drawings showing non-limiting embodiments, wherein FIG. 1 shows an embodiment of a driver circuit for operating one or more LEDs in accordance with the present invention;

FIGS. 3a-3c show simulated current and voltage waveforms of a driver circuit in accordance with the present invention.

In the drawings, the same reference symbols refer to the same or similar elements.

Figure 1:
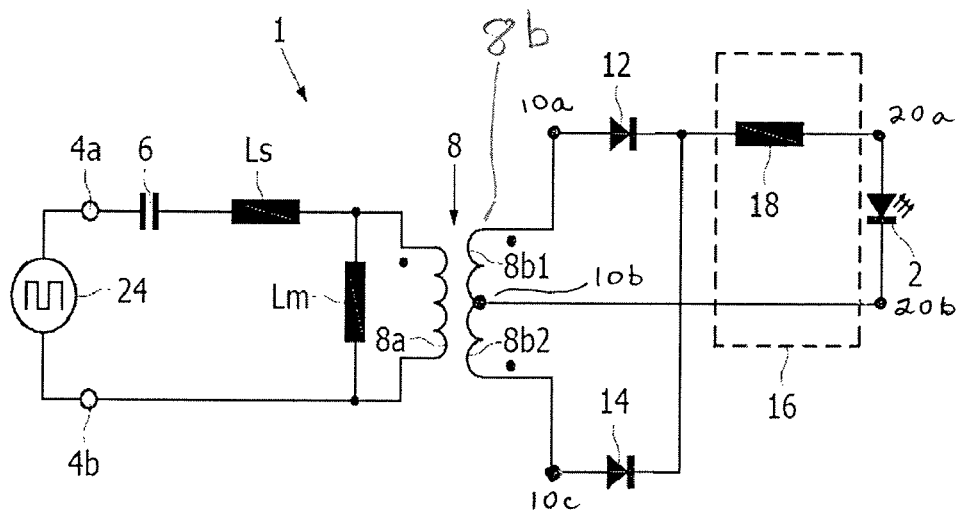

FIG. 1 shows a circuit diagram of an embodiment of a driver circuit 1 for operating one or more LEDs 2. The driver circuit 1 comprises a set of input terminals 4a and 4b and a resonant capacitor 6 connected in series to a primary winding 8a of a transformer 8. A stray inductance Ls and a main inductance Lm of the primary winding 8a are indicated. These inductances Ls and Lm are not actual elements, but are shown since these inductances Ls and Lm may be selected in combination with the capacitance of the resonant capacitor 6 such that zero voltage switching is obtained in a voltage source 24 connected to the input terminals 4a and 4b, improving the overall efficiency of the illustrated circuit.

The illustrated transformer 8 has a split secondary winding 8b, having a first coil 8b1 and a second coil 8b2. The secondary winding 8b may as well be embodied as two separate windings wound around a common core, for example. The secondary winding 8b has three terminals 10a, 10b and 10c. The terminal 10b is a common terminal for both coils 8b1 and 8b2. The further terminals 10a and 10c are connected to respective diodes 12 and 14 for rectifying an alternating voltage on the secondary winding 8b. An output choke 18, i.e. a suitable inductor, is comprised in an output circuitry 16. The output circuitry 16 further comprises output terminals 20a and 20b. A LED 2 is connected to the output terminals 20a and 20b. However, there may be more than one LED connected to the output terminals 20a and 20b. If more than one LED is connected to the driver circuit 1, they may be connected in parallel or in series or may be arranged in parallel sets of LEDs connected in series.

Figure 2:
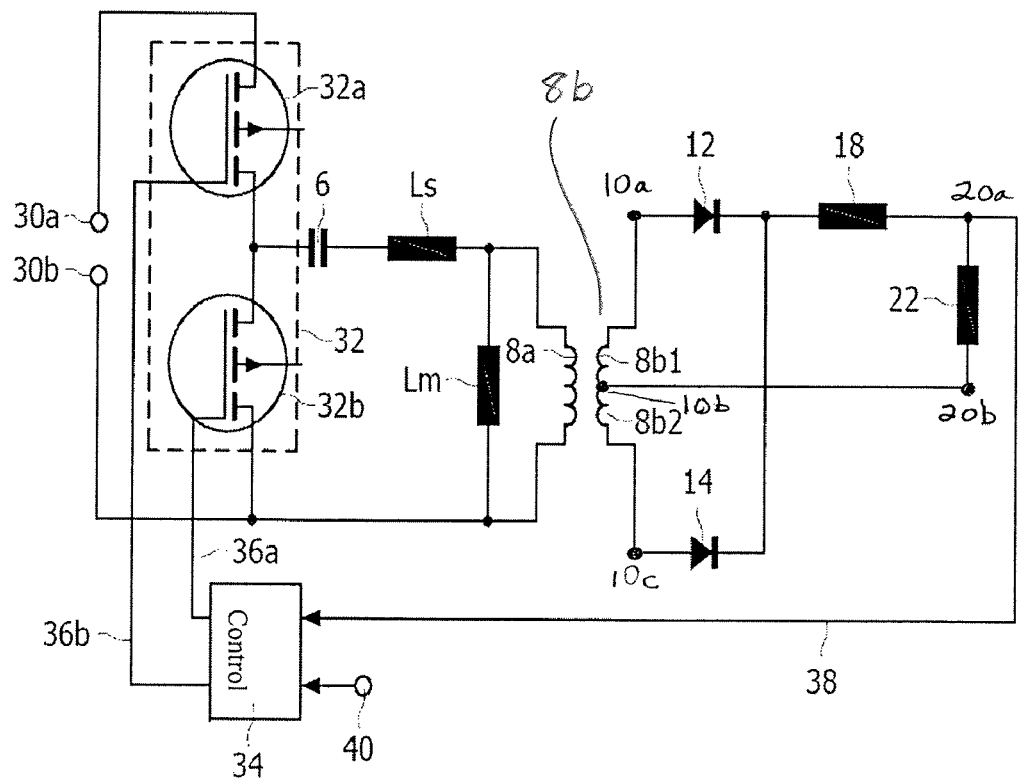
FIG. 2 shows a further embodiment of a driver circuit according to the present invention.

In FIG. 1 the voltage source 24 is connected to the input terminals 4a and 4b. FIG. 2 shows an embodiment wherein a DC voltage source, supplying a substantially constant voltage, may be connected to input terminals 30a and 30b of a bridge circuit 32. The bridge circuit 32 comprises a first switch 32a and a second switch 32b. The bridge circuit 32 may generate a suitable supply voltage and supply it to the input terminals 4a and 4b of the circuit of FIG. 1 (also indicated in FIG. 2). Further in the embodiment of FIG. 2, a control circuit 34 controls the switches 32a and 32b of the bridge circuit 32 using respective control signals 36a and 36b. The control circuit 34 has a LED control signal 38 as an input. The LED control signal 38 is a LED voltage, for example, that may be compared to a predetermined reference voltage 40, as indicated in FIG. 2. The control circuit 34 determines the control signals 36a and 36b in response to the input LED control signal 38.

The operation of the driver circuits illustrated in FIGS. 1 and 2 is now described with reference to FIGS. 3a-3c. In FIGS. 3a-3c, the horizontal axis represents time. In FIG. 3a, the vertical axis represents a voltage; in FIGS. 3b and 3c, the vertical axis represents a current. In each FIG. 3a-3c, a zero level is indicated on the vertical axis.

In FIG. 3a a supply voltage Vs supplied to input terminals 4a and 4b is shown. The illustrated supply voltage Vs is a DC voltage having a block-shaped varying voltage level, e.g. generated by the bridge circuit 32 shown in FIG. 2.

FIG. 3b illustrates an alternating supply current Is supplied to the primary winding 8a of the transformer 8. The alternating current Is has the same frequency and duty cycle as the supply voltage Vs, but alternates in polarity due to the resonant characteristics of the series connection of the resonant capacitor 6 and the inductances Ls and Lm of the primary winding 8a.

Due to the alternating current Is through the primary winding 8a of the transformer 8, an alternating secondary winding voltage is generated on the secondary winding 8b of the transformer 8. As a person skilled in the art readily understands, due to the arrangement of the diodes 12 and 14 in combination with the arrangement of the first and second coils 8b1 and 8b2 of the secondary winding 8b, a current flows alternately through the first diode 12 or the second diode 14 depending on the voltage level of the supply voltage Vs. Both currents are supplied to the output choke 18 acting as a buffer element. The output choke 18 is selected such that the output load current to be supplied to a load 22 connected to the output terminals 20a and 20b, such as one or more LEDs, is substantially constant.

The load current is illustrated in FIG. 3c as comprising two components. In FIG. 3c, a first load current ID1) generated from the current flowing through the first diode 12 and a second load current ID2 generated from the current flowing through the second diode 14 is shown. The load current is the sum of these both components ID1 and ID2, which is a substantially constant current.

It is noted that the first diode 12 and the second diode 14 may be replaced by synchronous rectifying switches, which is eased by the smooth commutation of the output diode currents.

From FIGS. 3a-3c it may be understood that the driver circuit 1 operates very well with the duty cycle of the supply voltage at 50%, as shown. However, the duty cycle may as well be varied depending on design and functionality.

The invention claimed is:

1. A driver circuit for operating a light emitting diode, the driver circuit being configured to control a current to be supplied to the LED, the driver circuit comprising:
a set of input terminals for receiving a supply voltage;
a resonant capacitor;
a transformer, a primary winding of the transformer and the resonant capacitor being coupled in series to the set of input terminals;
a rectifier means coupled to the secondary winding of the transformer for rectifying an alternating load voltage on the secondary winding of the transformer;
an output circuit coupled to the rectifier means for receiving a rectified voltage, the output circuit comprising a buffer circuitry and a set of output terminals for coupling the LED to the driver circuit, wherein the buffer circuitry comprises an inductor connected in series with the set of output terminals, and the value of the inductor is selected to provide a substantially constant current through the LED.

2. A driver circuit according to claim 1, wherein the secondary winding of the transformer comprises a first coil and a second coil.

3. A driver circuit according to claim 2, wherein the secondary winding is a split winding.

4. A driver circuit according to claim 2, wherein the rectifier means comprises a first diode and a second diode, each diode being coupled to a respective coil of the secondary winding.

5. A driver circuit according to claim 2, wherein the rectifier means comprises a first switch and a second switch, each switch being coupled to a respective coil of the secondary winding, the first and second switches being configured to rectify the alternating secondary winding voltage.

6. A driver circuit according to claim 1, wherein the driver circuit comprises a bridge circuit coupled to the set of input terminals, the bridge circuit comprising bridge input terminals for receiving a DC voltage and the bridge circuit being configured to generate the supply voltage for generating the alternating supply current.

7. A driver circuit according to claim 6, wherein the driver circuit further comprises a control circuit having a control input terminal for receiving a LED control signal and controlling the bridge circuit in response to said LED control signal in order to control at least one of a duty cycle and a frequency of the alternating supply current.

* * * * *